United States Patent
Holland et al.

(10) Patent No.: US 9,774,221 B1
(45) Date of Patent: Sep. 26, 2017

(54) MAGNETIC END EFFECTOR

(71) Applicant: X Development LLC, Mountain View, CA (US)

(72) Inventors: Eric Holland, Mountain View, CA (US); Michael George Sleator, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/130,874

(22) Filed: Apr. 15, 2016

(51) Int. Cl.
| | |
|---|---|
| *B66C 1/04* | (2006.01) |
| *E21B 31/06* | (2006.01) |
| *H02K 1/06* | (2006.01) |
| *H02K 41/02* | (2006.01) |
| *B25J 15/00* | (2006.01) |
| *B64C 25/00* | (2006.01) |
| *B64C 39/02* | (2006.01) |

(52) U.S. Cl.
CPC ............ *H02K 1/06* (2013.01); *B25J 15/0028* (2013.01); *B64C 25/001* (2013.01); *B64C 39/024* (2013.01); *H02K 41/02* (2013.01); *B64C 2201/00* (2013.01)

(58) Field of Classification Search
CPC .............................. H01F 7/206; H01F 7/0257
USPC .......................... 335/285–289, 306; 294/65.5
See application file for complete search history.

(56) References Cited

U.S. PATENT DOCUMENTS

| | | | | |
|---|---|---|---|---|
| 2,243,616 | A * | 5/1941 | Julius ..................... | H01F 7/0257 269/8 |
| 3,040,921 | A * | 6/1962 | Davis ........................ | B66C 1/04 294/106 |
| 5,166,654 | A * | 11/1992 | Doyelle ................ | H01F 7/0257 335/288 |
| 5,299,845 | A * | 4/1994 | Gabriel ..................... | B66C 1/34 294/2 |
| 6,155,619 | A * | 12/2000 | Kirkpatrick ............... | B66C 3/04 294/3 |
| 6,168,219 | B1 * | 1/2001 | Futa .......................... | B66C 1/06 294/106 |
| 7,161,451 | B2 * | 1/2007 | Shen ..................... | B23Q 3/1546 335/289 |
| 8,757,689 | B2 * | 6/2014 | Ding ......................... | B66C 1/04 294/65.5 |
| 9,484,137 | B2 * | 11/2016 | Kocijan ................ | B25B 11/002 |
| 2004/0004362 | A1 * | 1/2004 | Love .......................... | B66C 3/04 294/3 |

(Continued)

OTHER PUBLICATIONS

Hilton, Adjustable linear Halbach array, 2012.*

*Primary Examiner* — Alexander Talpalatski
(74) *Attorney, Agent, or Firm* — McDonnell Boehnen Hulbert & Berghoff LLP

(57) ABSTRACT

A magnetic end effector utilizing a switchable Halbach array includes a pair of opposing members that can move towards and away from each other. The switchable Halbach arrays are located on or near the inner surface of the opposing members. A mechanical switching system is used to control the switchable Halbach arrays by moving one or more magnets that make up the switchable Halbach arrays. When manipulated in a certain way, the switchable Halbach arrays cause the opposing members to move towards each other, and when manipulate in a different manner, cause the opposing members to move away from each other.

12 Claims, 6 Drawing Sheets

(56) References Cited

U.S. PATENT DOCUMENTS

2009/0027149 A1\* 1/2009 Kocijan ................ B25B 11/002
                                                    335/288
2016/0208580 A1\* 7/2016 Delzell .................. E21B 33/12

\* cited by examiner

MAGNETIC END EFFECTOR

BACKGROUND

Robotic devices, such as robotic arms, may include various components or attachments that are designed to interact with the environment. Such a component or attachment is referred to as an "end effector".

The structure and function of an end effector may vary according to the tasks it is intended to perform. For instance, an end effector referred to as a "gripper" may be attached or integrated with a robotic arm, such that the robotic arm can used for applications that involve picking up and/or moving objects.

Further, various types of gripper end effectors are possible. For example, impactive grippers may include jaws or opposing "fingers" which are moveable to physically grasp an object. As another example, astrictive grippers may secure an object by creating a vacuum between the gripper surface and the object, or by utilizing magneto-adhesion or electro-adhesion between the gripper surface and the object. Other types of grippers and other types of end effectors are also possible.

SUMMARY

The following disclosure is directed toward an end effector having at least one switchable Halbach array. The end effector may be a gripper that can alternatingly secure or release an object using a mechanical switching mechanism to adjust the magnetic field of the switchable Halbach array. In some embodiments, an end effector, which can be attached to a robotic arm or another robotic device, may include a plate with a switchable Halbach array embedded therein or arranged thereon. A rack and pinion switching system may be operable to re-orient the magnets in the Halbach array and flip the strong and weak sides of the Halbach array's magnetic field. Accordingly, the rack and pinion switching system may allow the end effector to alternatingly secure or release (or perhaps more loosely secure) ferromagnetic and/or ferrimagnetic objects, by re-orienting the Halbach array such that the strong side or the weak side of its magnetic field, respectively, falls on the object-facing side of the plate.

As another example, opposing members of a robotic gripper may each have a Halbach array embedded therein or arranged thereon. One or both of the Halbach arrays may include a rack and pinion switching system that is operable to re-orient the magnets in the Halbach array, and flip the strong and weak sides of the Halbach array's magnetic field. Additionally or alternatively, the rack and pinion switching system could be configured to re-orient the magnets in the Halbach array to reverse the polarity of the Halbach array's magnetic field (without flipping the strong and weak sides). As such, the members of the robotic gripper could be closed by adjusting the Halbach arrays such that the magnetic fields pull the members together, and opened by flipping the strong and weak sides of at least Halbach array, or perhaps adjusting the Halbach arrays such that the magnetic fields push the members away from one another. The fact that such a robotic gripper can be closed around and hold an object using only magnetic fields may be beneficial. In particular, once such a robotic gripper is closed around an object, the gripper can remain closed and continue to hold the object, even if power to the gripper is lost.

In a first aspect, a magnetic end effector includes a pair of opposing members, where the pair of members include a first and second member, where the first and second members are movable towards and away from each other, a first switchable Halbach system located on or near an inner surface of the first member, a second switchable Halbach system located on or near an inner surface of the second member and a mechanical switching system that is operable to move one or more magnets of the first switchable Halbach system, the second switchable Halbach system or both at a first state in which magnetic fields of the first and second switchable Halbach systems pull the first member and the second member towards each other and move one or more magnets of the first switchable Halbach system, the second switchable system or both to a second state in which magnetic fields of the first and second switchable Halbach systems do not pull the first and second members towards each other or pull the first and second members towards each other to a lesser extent that in the first state.

In another embodiment, an actuator links the first and second member. Alternatively, the actuator is an elastic actuator.

In a further embodiment, the operation of the switchable Halbach array in the first state results in the magnetic field of the Halbach array being turned off such that the object is gripped and where the operation of the switchable Halbach array in the second state results in the magnetic field of the Halbach array in each of the finger elements generating a magnetic field with the same polarity such that the object is released from the end effector In one embodiment the object further comprises one or more second switchable Halbach arrays.

In a further embodiment, the end effector is attached to an airborne drone. The airborne drone is capable of attaching or parking itself to elevated articles, and where the elevated articles may consist of one or more switchable Halbach arrays.

Another embodiment discloses an end effector that includes a gripping surface, a switchable Halbach system located at or near the gripping surface, and a mechanical switching system that is operable to move one or more magnets of the switchable Halbach system to place the switchable Halbach system in a first state in which a strong side of a magnetic field of the switchable Halbach system is located on an object-facing side of the gripping surface, and move one or more magnets of the switchable Halbach system to place the switchable Halbach system in a second state in which a weak side of a magnetic field of the switchable Halbach system is located on the object-facing side of the gripping surface.

In another embodiment, the operation of the switchable Halbach array in the first state results in the magnetic field of the Halbach array being turned on such that the object is secured to the gripping surface and where the operation of the switchable Halbach array in the second state results in the magnetic field of the Halbach array being turned off such that the object is released from gripping surface of the end effector.

In a different embodiment, the object may further include a switchable Halbach array.

In a further embodiment, the end effector is attached to an airborne drone where the airborne drone attaches itself to elevated article and the elevated articles further comprises one or more third switchable Halbach arrays.

These as well as other aspects, advantages, and alternatives will become apparent to those of ordinary skill in the art by reading the following detailed description with reference where appropriate to the accompanying drawings. Further, it should be understood that the description pro-

DETAILED DESCRIPTION

Figure 1A:
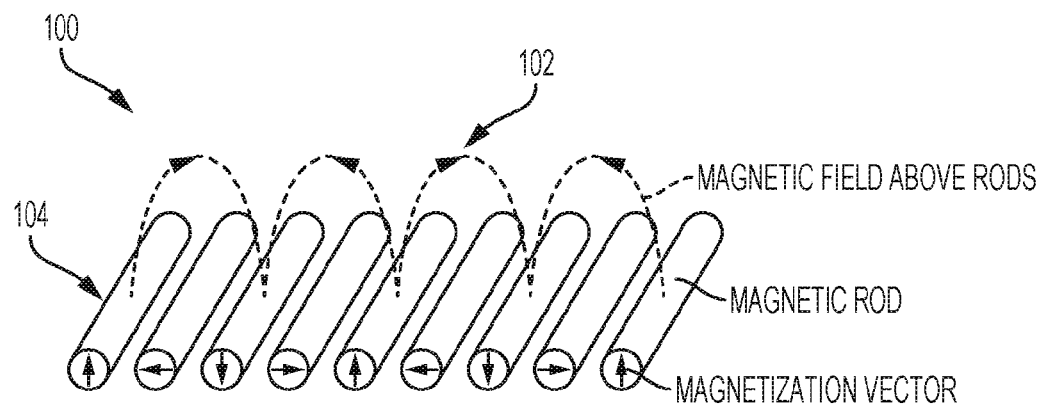
FIGS. 1A and 1B are an illustration of magnetic rod arrangement in a Halbach array.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the embodiments described herein are not meant to be limiting. It will be readily understood that certain aspects of the disclosed systems and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise. It will be readily understood that certain aspects of the disclosure can be arranged and combined in a wide variety of different configurations, all of which are contemplated herein.

I. Overview

As noted above, an end effector is the device at the end of a robotic arm designed to interact with the environment. One common application of an end effector is to grip objects (i.e. grippers). There are many types of grippers and many of them use electric power; e.g., to physically close a mechanical claw around and object, and apply enough force to the object to hold the object between the claws while moving the object about. One disadvantage of a gripper that requires power in order to secure an object is that when the flow of electricity is interrupted, the end effector may abruptly and unintentionally release the object. In order to prepare for such failure scenarios, such an end effector may include a mechanical mechanism as a backup, such as a mechanical locking gear set or equivalent, in order to maintain a grip on an object when power is lost. However, such mechanical backup systems can increase the cost and complexity of a gripper.

Thus, there is a need to improve end effectors, and grippers in particular, so that in cases where power to the gripper is lost, the gripper can continue to grip an object and avoid having it fall out of the gripper. Accordingly, example embodiments may help provide a fail-safe magnetic gripper by utilizing one or more switchable Halbach arrays to secure an object, such that a grip on the object can be maintained, regardless of whether power is supplied to the gripper.

For example, a magnetic end effector may include a pair of opposing members (e.g., a claw or opposing "fingers"), which are capable of moving towards or away from each other. Each of the opposing members may include a switchable Halbach array which is formed by an array of rotatable magnetic rods that are aligned parallel to one another, and which can be oriented so as to produce a magnetic field with a strong side and a weak side. By the rotating magnets forming a given switchable Halbach array, the strong side and weak sides may be flipped, so as to control whether the magnetic field on the inner surface of the corresponding member (e.g., the surface inside of a claw, facing the opposing member of the claw) strong or weak (or perhaps canceled out entirely). Further, in some embodiments, by the rotating magnets forming a given switchable Halbach array, the polarity of the magnetic field may be controlled, e.g., so that a switchable Halbach array can reverse the polarity of a strong magnetic field on the inner surface of a corresponding member.

Configured as such, the magnetic fields of one or both of the switchable Halbach systems in opposing members of a gripper may be adjusted so that the strong side magnetic fields face each other, and have opposite strong-side polarities, such that the opposing members are pulled together by the magnetic fields of the Halbach arrays. The switchable Halbach systems may thus be switched to the foregoing arrangement in order to close the members around an object and hold it in place. Advantageously, since the magnetic forces press the members against the object, the members can continue to grip the object, even if electrical power is not supplied to the gripper.

Further, the magnetic fields of switchable Halbach systems in opposing members of a gripper may be adjusted so that the weak side magnetic fields face each other (or perhaps such that a weak side of one member's field faces the strong side of the opposing member's field). By configuring the switchable Halbach arrays as such, the gripper may loosen its grip on an object, or perhaps release an object altogether. Additionally or alternatively, the magnetic fields of one or both of the switchable Halbach systems may be adjusted so that the strong side magnetic fields face each other, and have the same strong-side polarity, such that that the opposing members are pushed away from one another by the magnetic fields of the Halbach arrays. Therefore, by adjusting the Halbach arrays in this manner, the gripper may be opened up.

In other embodiments, an end effector may include a single Halbach array, which can magnetically secure objects to a surface of the end effector. In particular, a mechanical switching system of the end effector can manipulate the magnets forming the Halbach array so that the strong side of the magnetic field is on an object-facing side of the end effector's surface, such that a magnetic object can be magnetically secured to the end effector. Further, the magnets forming the Halbach array can be re-oriented (e.g., by rotating some or all the magnets) so that the weak side of the magnetic field is on the object-facing side of the end effector's surface. By re-configuring the switchable Halbach system in this manner, the end effector may release an object, or at least loosen its grip on the object (e.g., so that is easier for a human or another robotic device to remove the object from the end effector).

II. Examples of Switchable Halbach Arrays

A switchable Halbach arrays may be used in various magnetic end effector applications. Generally, a Halbach array may achieve an amplified magnetic field on one side of the array while almost completely cancelling the magnetic field on the other side (or "one-sided flux"), by arranging a number of magnetic rods so as to have a spatially rotating pattern of magnetization. For instance, an array of discrete magnetic rods can be arranged n to approximate a spatially rotating pattern by placing the magnetic rods parallel to one another and rotating each of the rods such that each subsequent rod in the array has polarization direction is rotated by 90 degrees from the polarization direction of the previous rod in the array. For example, if a first rod is polarized towards 0 degrees, the second rod will be arranged with its polarization at 90 degrees, the third rod will be arranged with its polarization at 180 degrees, the fourth rod will be arranged with its polarization at 270 degrees, and so on.

Figure 1B:
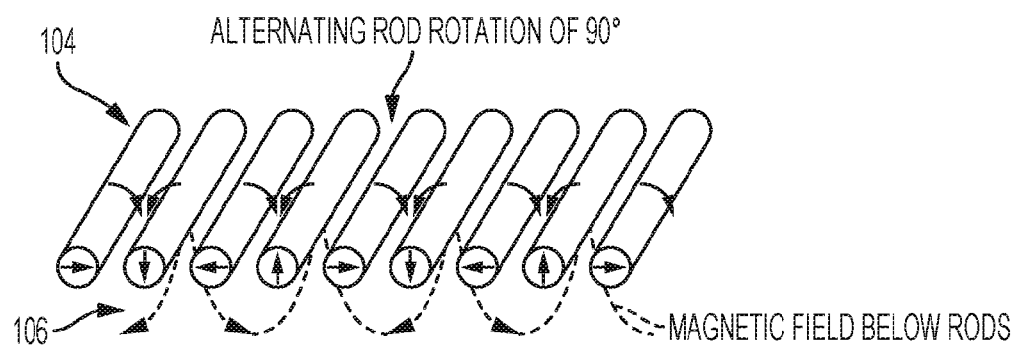

For example, FIG. 1A shows an arrangement of magnetic rods in Halbach array 100. To be made switchable, a Halbach array may include a mechanism for mechanically rotating some or all of the magnets in the array, so as to reverse the magnetic field 102 (e.g., so that the magnetic field is canceled out on the side where it was previously concentrated, and vice versa). For instance, FIG. 1B shows how the magnetic rods 104 from the Halbach array shown in FIG. 1A may be rotated to reverse the magnetic field 106 of the Halbach array. Reversal of the magnetic field may also occur when the magnets are moved further apart or closer to each other in the direction perpendicular to the axis of the magnetic rods 104. For example, if the magnetic rods 104 are moved perpendicular to the axis away from each other, to a distance two magnet spacings apart, the polarity may be reversed without having to rotate the magnetic rods 104.

Thus, to be made switchable, a Halbach array may include a mechanism for mechanically rotating some or all of the magnets in the array, so as to reverse the magnetic field 102 (e.g., so that the magnetic field is canceled out or made substantially weaker on the side where it was previously concentrated, and vice versa). For example, FIGS. 2A and 2B are illustrations a switchable Halbach array 200, according to an example embodiment.

As shown, the switchable Halbach array 200 includes a rack and pinion system for re-orienting the magnets in the switchable Halbach array 200. More specifically, the rack and pinion system includes a notched slider 1002 that engages its teeth in cylindrical housings 204 that hold magnetic rods 1006 that make up the switchable Halbach array 200. A rack and pinion is a type of linear actuator that comprises a pair of gears which convert rotational motion into linear motion. A circular gear called "the pinion" (in the present invention the cylindrical housing 204) engages teeth on a linear "gear" bar called "the rack" (in the present invention the notched slider 202); rotational motion applied to the pinion causes the rack to move relative to the pinion, thereby translating the rotational motion of the pinion into linear motion. The array housing 208 holds the notched slider 202 and cylindrical magnetic-rod housings 204 in place, such that sliding the slider 202 to a specific location between two positions flips the magnetic field back and forth.

Figure 2A:
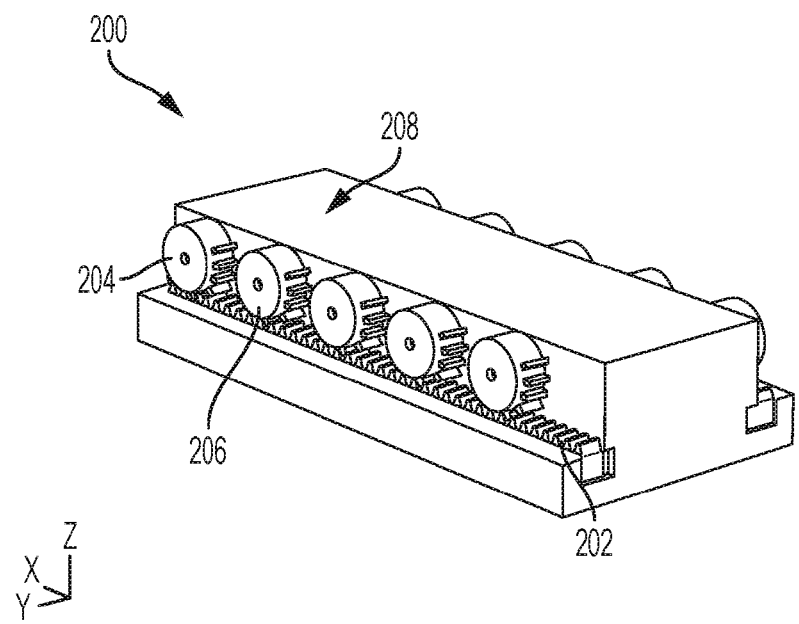
FIGS. 2A and 2B are an illustration of an example switchable Halbach array.
Figure 2B:
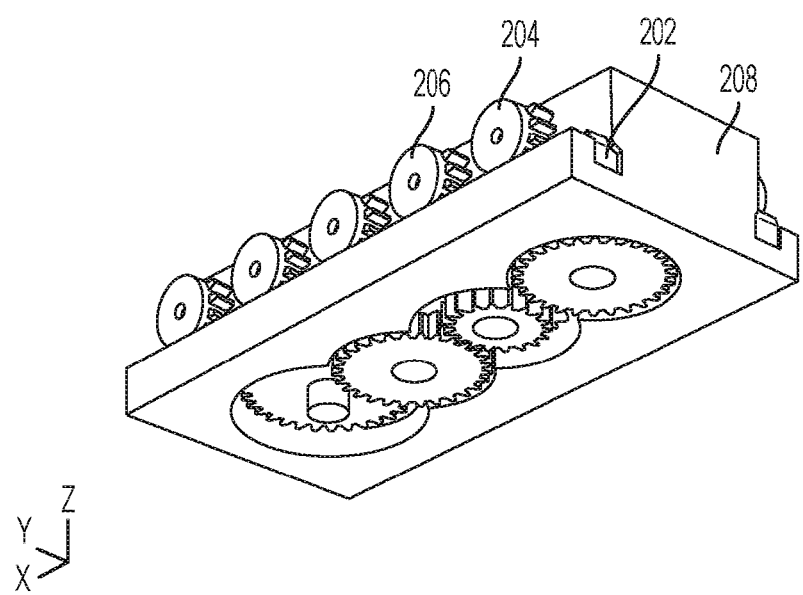

Specifically the switchable Halbach array 200 illustrated in FIGS. 2A and 2B is encased in an array housing 208 and includes five cylindrical diametrically-polarized NIB magnets 206. Each magnet 206 has a geared cylindrical housing 204 attached to its end, which mates with one of two notched sliders 202 running along either side of the housing 208. Each slider 202 is, in turn, moved by a second set of teeth engaged with a central gear (not shown), which is the final gear in a four-gear train providing about a 12:1 ratio. The input of the gear train would generally be driven by a small electric motor. The rack and pinion mechanism can be replaced with a cascaded worm gear design, where the racks are replaced with worms which are turned by gears driven by a worm on the motor shaft. This would provide a much higher gear ratio in a similar space.

Further, it should be understood that the examples of switchable Halbach arrays described in reference to FIGS. 1A, 1B, 2A, and 2B are not intended to be limiting. Other types of switchable Halbach arrays may be utilized in example embodiments, without departing from the scope of the invention.

III. Examples of End Effectors Using Switchable Halbach Arrays

An example magnetic end effector may include one or more opposing members that are used to grip an object. Further, each opposing member includes at least one switchable Halbach array. In order to grip an object, the switchable Halbach arrays are manipulated to generate magnetic fields such that the opposing members can switch between an open and a closed state. A closed state does not necessarily mean that the opposing members are touching each other or that the opposing members are moving towards each other. Instead, a closed state could be a condition where the opposing members are pulled towards each other, and stationary, to a greater degree than they are apart. In end effectors that use a flat gripping surface, a switchable Halbach array is embedded underneath the gripping surface. The gripping surface is in direct contact with an object and grips on to the object using magnetic forces generated by the switchable Halbach array. For example, the switchable Halbach array can be turned on to generate a magnetic field so that an object can be pulled in by the magnetic field and pulled towards the gripping surface.

Further, an example system using the one or more finger elements may include an airborne drone system that can grip onto ceilings to park or extend its loiter time without having to come down to the ground. One example using a single finger element on an airborne drone system would be to use the switchable Halbach array embedded in the gripping surface to attach onto an elevated article. An elevated article could be a ceiling surface or part, a tree, ceiling fixtures, wires or any other materials that is elevated. The elevated article can be of metallic, magnetic or could include a second switchable Halbach array such that the two switchable Halbach arrays (one attached to the airborne drone and the other in the elevated article) could pull and grip each other. One embodiment using opposing members on an airborne drone system would use the opposing members to grab on to the elevated articles.

Figure 3A:
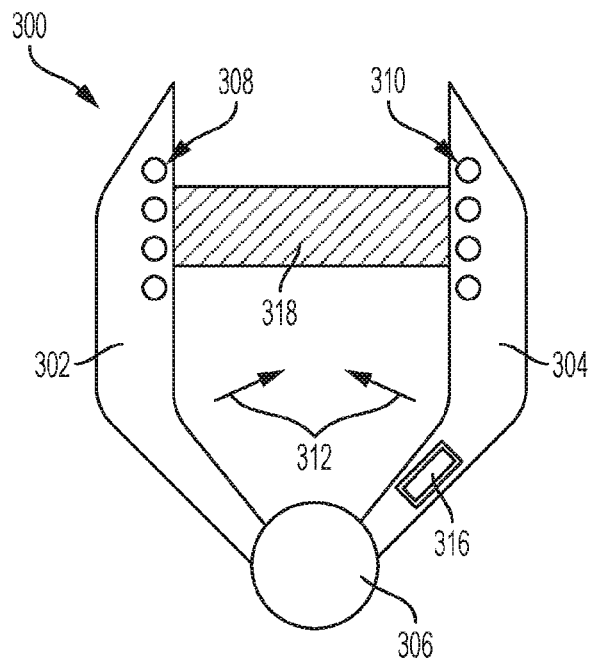
FIG. 3A is an illustration of a magnetic end effector according to an example embodiment.

Referring to FIG. 3A, an example switchable end effector is shown. The end effector 300 includes opposing members 302, 304. The opposing members 302, 304 are connected by an actuator 306, such as an elastic actuator, on a first end. The second end of the opposing members 302 304 includes an embedded switchable Halbach array 308, 310. The opposing members 302 304 further include mechanisms (not shown), such as gears and sliders, that are used to rotate the magnetic rods that make up the switchable Halbach arrays 308, 310. By adjusting and manipulating the magnetic fields generated by the switchable Halbach arrays 308, 310, the degree of movement of the opposing members 302, 304 can be adjusted. This adjustment allows the user to adjust the forces that are applied to an object 318 by the opposing members 302, 304. Additionally, if the user intends to leave the finger elements 302, 304 separated a certain distance or clamped together for an extended period of time, as long as the user sets the magnetic field generated by the switchable Halbach arrays 308, 310 to a desired strength, the user need not concern him/herself about the opposing members 302, 304 moving apart or coming together in cases where the power supply to the end effector is lost etc.

In a further aspect, the end effector 300 includes a control system 316. The control system 316 may take the form of and/or may include various types computing devices, communication interfaces, various interfaces to sensors, and/or interfaces to various user-input devices, among other possibilities. Generally, a control system 316 will at least include a processor, executable program instructions stored on a non-transitory computer readable medium, and communication interfaces that allow for communications to be sent to and/or received from the various components of the end effector 300, such that functions described herein may be carried out by the end effector 300.

For example, control system 316 may include program instructions that are executable by a processor to operate the switchable Halbach arrays 308, 310 in a closed and open state. The closed state is when the second ends of the opposing members 302, 304 are touching each other or are gripping an object 318. To achieve a closed state, a first switchable Halbach array 308 in a first opposing member 302 is turned such that the polarity of the magnetic field generated by the first switchable Halbach array 308 radiates towards the second opposing member 304 in a first magnetic polarity. The second switchable Halbach array 310 in the second opposing member 304 is turned such that the polarity of the second magnetic field generated by the second switchable Halbach array 310 is opposite that of the first magnetic field. The two opposing first and second magnetic fields will cause the second end of the opposing members 302, 304 to pull towards each other such that the second end of the opposing members 302, 304 touch each other or grip an object 318. The closed state can also be achieved by just the actuator 306. The actuator 306 is an elastic actuator where when the switchable Halbach arrays 308, 310 are turned off and no additional forces are applied to the actuator 306, the actuator 306 pulls 312 the second end of the opposing members 302, 304 together creating a closed state.

The open state is when the second ends of the opposing members 302, 304 are not touching each other or are not gripping an object 318. The open state is achieved by adjusting the strength of the magnetic fields generated by the first and second switchable Halbach arrays 308, 310. The polarity of the magnetic fields generated by the switchable Halbach arrays 308, 310 are polar opposites, but by adjusting the strength of the magnetic fields, the second end of the opposing members 302, 304 do not reach the closed state, but remain separated. Another way of achieving the open state is when the first and second magnetic fields generated by the first and second switchable Halbach arrays 308, 310 have the same magnetic polarity such that the opposing members 302, 304 pushed apart.

In another embodiment, only the first opposing member 302 includes an embedded switchable Halbach array 308. The second opposing member 304 does not include a switchable Halbach array and is constructed of a metallic material susceptible to magnetic fields. By turning on and off the switchable Halbach array 308 the end effector 300 can be manipulated to be in the open or closed state.

Figure 3B:
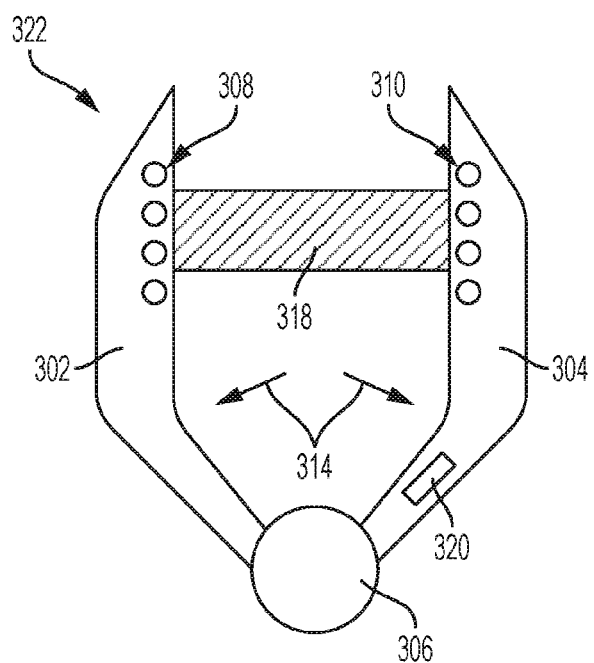
FIG. 3B is an illustration of another example embodiment of a magnetic end effector.

In an alternative embodiment, shown in FIG. 3B, the actuator 306, which is an elastic actuator, and is configured such that when no forces are applied to the actuator 306 or the opposing members 302, 304, the opposing members 302, 304 push away from each other 314 to create an open state.

In a further embodiment, the switchable magnetic arrays 308, 310 are positioned between the first and second ends of the opposing members 302, 304 such that the opposing members 302, 304 do not come in contact with an object 318 in a closed state. This configuration prevents the object 318 from coming in direct contact with the magnetic field generated by the switchable magnetic arrays 308, 310. This embodiment is advantageous in cases when the object 318 is sensitive to magnetic fields.

Figure 4A:
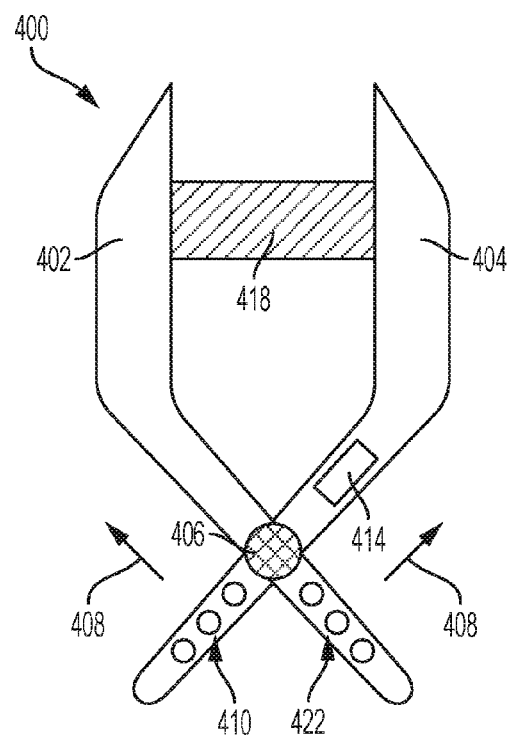
FIG. 4A is an illustration of one embodiment of a magnetic end effector.

Referring to FIG. 4A, another configuration of a magnetic end effector 400 is shown. The opposing members 402, 404 are connected together by an actuator 406 in the central portion of the opposing members 402, 404. The switchable Halbach arrays 410, 422 are embedded in the section of the finger elements 402, 404 that are below the actuator 406. This location prevents the magnetic field generated by the switchable Halbach arrays 410, 422 from affecting an object 418 that may be sensitive to magnetic fields.

In a further aspect, the end effector 400 includes a control system 416. The control system 416 may take the form of and/or may include various types computing devices, communication interfaces, various interfaces to sensors, and/or interfaces to various user-input devices, among other possibilities. Generally, a control system 416 will at least include a processor, executable program instructions stored on a non-transitory computer readable medium, and communication interfaces that allow for communications to be sent to and/or received from the various components of the end effector 400, such that functions described herein may be carried out by the end effector 400.

For example, control system 416 may include program instructions that are executable by a processor to operate the switchable Halbach arrays 410, 422 in a closed and open state.

To achieve a closed state, the switchable Halbach arrays 410, 422 are turned on such that the polarity of the magnetic field generated by the switchable Halbach arrays 410, 422 are the same and radiate towards each other. The resulting forces generated by the magnetic fields will push the switchable Halbach array apart such that the tips of the opposing members 402, 404 touch. The closed state can also be achieved by just the actuator 406. The actuator 406 is an elastic actuator where when the switchable Halbach arrays 410, 422 are turned off and no additional forces are applied to the actuator 406, the actuator 406 pushes opposing members 402, 404 apart to create a closed state.

The open state is achieved by turning the switchable Halbach arrays 410, 422 on in such a way that the magnetic fields generated by the switchable Halbach arrays 410, 422 are polar opposites of each other.

In another embodiment, only the first opposing member 402 includes an embedded switchable Halbach array 422. The second opposing member 404 does not include a switchable Halbach array and is constructed of a metallic material susceptible to magnetic fields. By turning the switchable Halbach array 422 on and off the end effector 400 can be manipulated to be in the open or closed state.

Figure 4B:
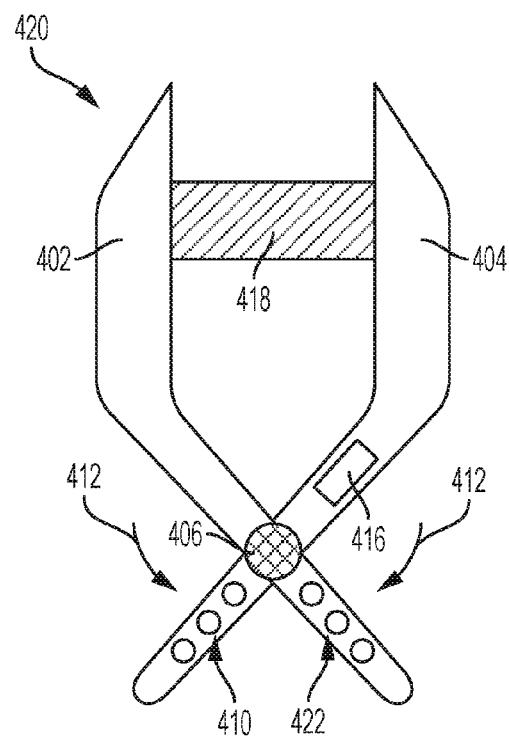
FIG. 4B is an illustration of a further embodiment of a magnetic end effector.

In an alternative embodiment, shown in FIG. 4B, the actuator 406, which is an elastic actuator, and is configured such that when no forces are applied to the actuator 406 or the opposing members 402, 404, the opposing members 402, 404 push away from each other 412 at the tip to create an open state.

III. Alternative Magnetic End Effector Configuration

Figure 5:
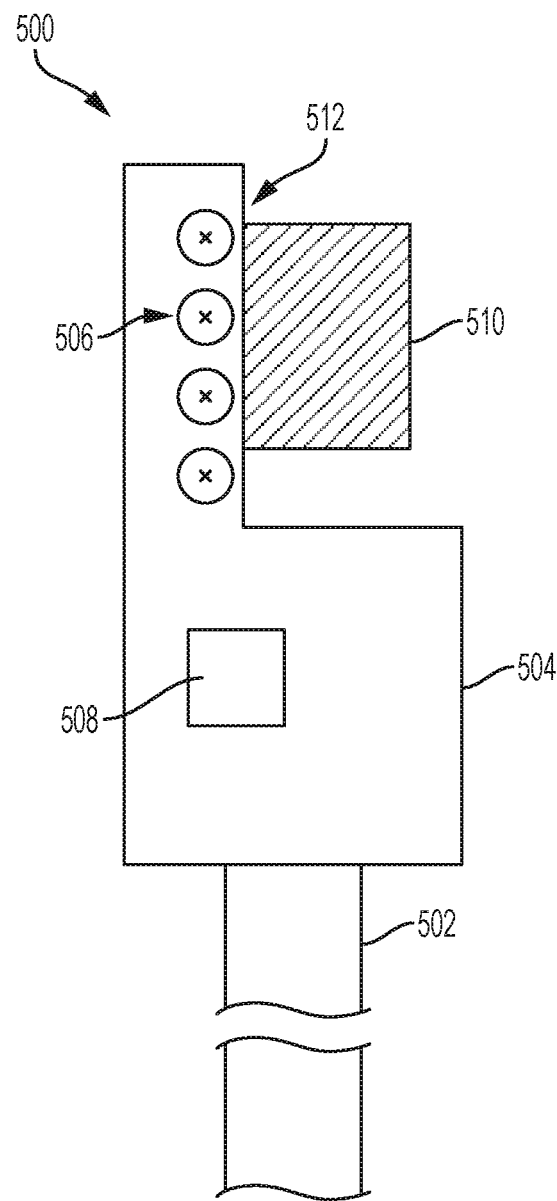
FIG. 5 is an illustration of a magnetic end effector according to one embodiment.

Referring to FIG. 5, a magnetic end effector 500 that utilizes a gripping surface instead of finger elements is shown. The magnetic end effector 500 includes a switchable Halbach array 506, positioned on one side of a gripping surface 512. The end effector 500 is connected to an arm 502, such as that of a robot etc. The length and size of the gripping surface 512 can be adjusted based on the end effector's 500 intended use. The end effector 500 further includes a control system 508. The control system 508 may take the form of and/or may include various types computing devices, communication interfaces, various interfaces to sensors, and/or interfaces to various user-input devices, among other possibilities. Generally, a control system 508 will at least include a processor, executable program instructions stored on a non-transitory computer readable medium, and communication interfaces that allow for communications to be sent to and/or received from the various components of the end effector 420, such that functions described herein may be carried out by the end effector 500. For example, control system 508 may include program instructions that are executable by a processor to: (i) operate the switchable magnetic array 506 in an open state in which a magnetic field of the switchable Halbach array 506 is turned off such that the end effector 500 releases the object 510; or ii) switch the switchable Halbach array 506 to operate in a closed state where the magnetic field generated by the switchable Halbach array 506 can grip an object 510 by pulling the object 510 against the gripping surface 512 of the end effector 500.

IV. Application of Magnetic End Effector on Airborne Drone

Figure 6A:
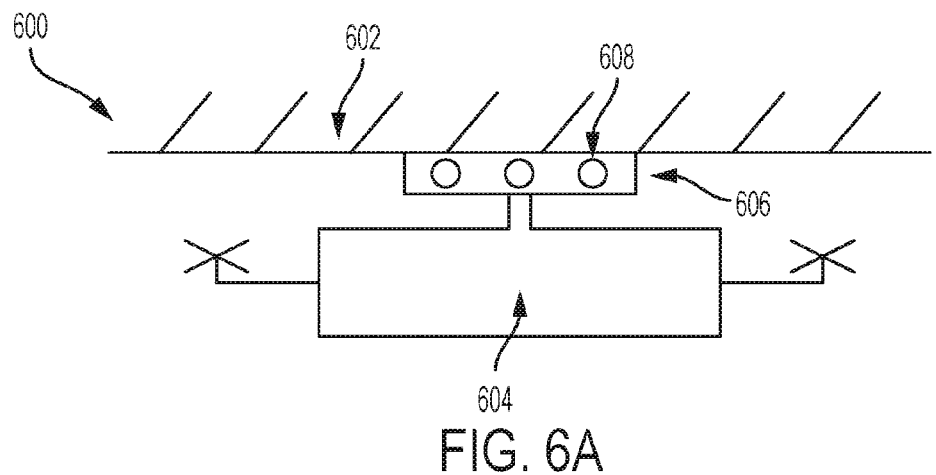
FIGS. 6A, 6B, and 6C are illustrations of an airborne drone using various variations of a magnet end effector.
Figure 6B:
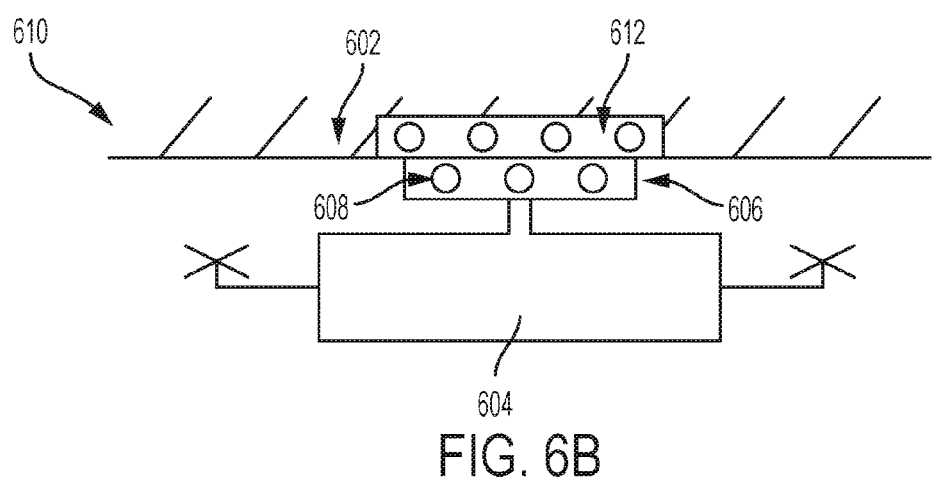
Figure 6C:
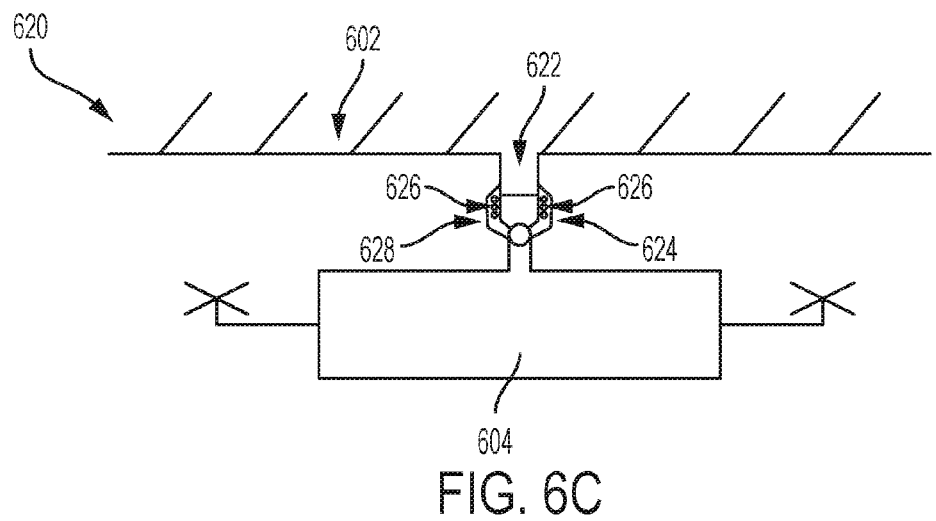

Referring to FIGS. 6A, 6B, and 6C, an application of a switchable Halbach array applied to an airborne drone is shown. FIGS. 6A, 6B, and 6C show an airborne drone 604 that is secured on an elevated article, such as a ceiling 602. In FIG. 6A, the airborne drone includes an extension with a platform 606 that houses a switchable Halbach array 608. By turning on the switchable Halbach array 608, the airborne drone 604 is able to secure itself on a ceiling 602. The ceiling 602 is made of a metallic material such that a magnet, such as a switchable Halbach array 608 can securely attach to the ceiling.

In another embodiment, FIG. 6B, the ceiling 602 further includes an embedded switchable Halbach array 612. The ceiling in such an embodiment does not have to be constructed out of a metallic material. Further, in such an embodiment, in cases where the switchable Halbach array 608 of the airborne drone 604 is malfunctioning, the switchable Halbach array 612 of the ceiling can help the airborne drone stay secured to the ceiling 602.

In another embodiment, in cases where the battery of the airborne drone 604 dies, the switchable Halbach arrays 608 612 of the airborne drone 604 or the ceiling 602 alone or in combination can secure the airborne drone's 604 position in the ceiling until an operator can recharge the battery of the airborne drone 604.

In a further embodiment, shown in FIG. 6C, the airborne drone 604 is equipped with a magnetic end effector including opposing members 624, 628 where a switchable Halbach array 626 is embedded in each of the opposing members 624, 628. The airborne drone 604 is capable of gripping an elevated article such as a hook or indentation 622 on the ceiling 602. In order to grip an indentation 622, the switchable Halbach arrays 626 are manipulated to generate magnetic fields with opposite polarity. This will force the opposing members 624, 628 to pull towards each other such that the opposing members 624, 628 grip the indentation 622.

In another embodiment, the switchable Halbach array 626 of only one of the opposing members 624 may turn on generating a magnetic field. The magnetic field can pull the other opposing member 628 such that the opposing members 624, 268 grip onto an indentation 622.

Further, in case of battery failure of the airborne drone 604, once the switchable Halbach array 626 was set up to grip onto an indentation 622, the airborne drone 604 will be able to maintain position on the ceiling until an operator arrives to repair or recharge the battery.

In a further embodiment, there may be instances where the airborne drone 604 is prepared to release itself, turns the switchable Halbach array 608 to the off position, but there is some residual magnetic force such that the airborne drone 604 cannot detach from the ceiling 602. In such cases, a motor- or solenoid-operated "kicker" could provide the necessary force for the airborne drone 604 to break free. The kicker mechanism could be embedded in the motorized system that rotates the magnets of the switchable Halbach array 608. For example, an extra tooth or small bump in the proper location on each of the gear segments on the magnets could push the airborne drone 604 away from the ceiling 602 surface.

V. Other Applications of Switchable Halbach Arrays

Additionally, an airborne drone's 604 switchable Halbach array 608 can be used to pick up and drop a payload. The switchable Halbach array 608 would be located on the bottom portion of the airborne drone 604, such that it could fly over a payload, turn the switchable Halbach array on and pick the payload up. The reverse process would happen when the payload needs to be released from the airborne drone 604.

In another embodiment, the airborne drone could be equipped with an end actuator on a robotic arm where tasks may require a more complex manipulation of a payload or an object. Use of a switchable Halbach array on the end actuator will allow the operator to manipulate the payload or object and be assured that the payload or object will not be released in case the power source of the airborne drone and the robotic arm is drained or fails.

A further embodiment would consist of a robot capable of using one or more switchable Halbach arrays to climb ferrous surfaces such as steel posts, cables, girders, and/or beams. These robots can be used for maintenance of suspension bridges, power transmission towers/cables, antennae in high rise buildings etc. Other embodiments and applications of switchable Halbach arrays are also possible.

VI. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

A computer-readable medium may include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A system comprising:
    an end effector comprising a pair of opposing members, wherein the pair includes a first member and a second member that are moveable towards and away from each other;
    a first switchable Halbach system located on or near an inner surface of the first member;
    a second switchable Halbach system located on or near an inner surface of the second member;
    an object gripped to be released by the first and second member; and
    a mechanical switching system that is operable to:
        move one or more magnets of the first switchable Halbach system, the second switchable Halbach system or both, to a first state in which magnetic fields of the first and second switchable Halbach systems pull the first member and the second member towards each other; and
        move one or more magnets of the first switchable Halbach system, the second switchable Halbach system, or both, to a second state in which magnetic fields of the first and second switchable Halbach systems either do not pull the first and second members towards each other or pull the first and second members towards each other to a lesser extent than in the first state.

2. The system of claim 1, wherein an actuator links the first and second member.

3. The system of claim 2, wherein the actuator is an elastic actuator.

4. The system of claim 1, wherein the operation of the switchable Halbach array in the first state results in the magnetic field of the Halbach array being turned off such that the object is gripped and wherein the operation of the switchable Halbach array in the second state results in the magnetic field of the Halbach array in each of the finger elements generating a magnetic field with the same polarity such that the object is released from the end effector.

5. The system of claim 1, wherein the object further comprises one or more third switchable Halbach arrays.

6. The system of claim 1, wherein the end effector is attached to an airborne drone.

7. The system of claim 6, wherein the airborne drone attaches itself to elevated articles.

8. The system of claim 7, wherein the elevated articles further comprises one or more fourth switchable Halbach arrays.

9. The system of claim 1, wherein the end effector is attached to the end of a robotic arm.

10. The system of claim 7, wherein the airborne drone includes a release mechanism.

11. The system of claim 7, wherein the elevated articles further comprise a magnetic flat surface.

12. The system of claim 9, wherein the robotic arm is attached to an airborne drone.

* * * * *